Patented Aug. 3, 1937

2,088,612

UNITED STATES PATENT OFFICE 2,088,612

POLYHYDRIC ALCOHOL-POLYBASIC ACID RESIN

Israel Rosenblum, Jackson Heights, N. Y.

No Drawing. Application June 27, 1934
Serial No. 732,625

15 Claims. (Cl. 260—8)

The present invention relates to the production of fusible and soluble resins suitable for the manufacture of air-drying and baking varnishes, paints and enamels, both white and colored, and composed of a polyhydric alcohol, one or more polybasic organic acids and one or more monobasic aliphatic acids including an acid derived by hydrolysis of a fatty triglyceride, which includes the oils, fats and waxes.

Investigations conducted by me on the reaction between a polyhydric alcohol such as glycerol, a polybasic aliphatic acid, such as maleic acid, succinic acid, etc., and, for example, a drying oil acid, such as linseed oil acids, have shown that when these materials are mixed and reacted together in the manner commonly employed in making polyhydric alcohol-polybasic acid resins (known generally as alkyd resins) it is impossible to obtain a homogeneous, fusible, soluble resin suitable for use in the varnish, lacquer, enamel and paint industries. Thus I have found that when glycerol, maleic acid and linseed oil acids are reacted together, two distinct layers are formed which cannot be made to fuse together to form a homogeneous mass even after prolonged heating; after a certain time the lower layer gels and the mass becomes useless for varnish and similar purposes. Similar results are obtained if the glycerol is reacted first with the maleic acid and subsequently with the drying oil acid, and also when the acids are first heated together to effect mixing and the glycerol subsequently added. The processes heretofore employed for the manufacture of resins by reaction between glycerol, phthalic acid and drying oil acids therefore result in failure when the phthalic acid is replaced by a polybasic aliphatic acid such as maleic acid.

It is the object of the present invention to provide a process whereby glycerol or other suitable polyhydric alcohol, a polybasic aliphatic acid which ordinarily form a non-homogeneous mass when reacted with glycerol and a relatively large quantity of fatty oil acids, and an acid or the acids derived from a fatty oil or from a fat in quantity sufficient to make the product oil-soluble in the case of phthalic acid, may be reacted together and yet form a homogeneous, fusible, soluble resin suitable for use in the manufacture of varnishes, lacquers, enamels, and paints. More particularly, it is an object of the invention to provide a uniform and homogeneous resin which is soluble in the common solvents, including petroleum and coal tar distillates and mixtures thereof, and is compatible with oils without decomposition, by the use of materials which heretofore under similar conditions have yielded only non-homogeneous, useless masses. It is also an object of the invention to produce a resinous composition which is stable and is of relatively low acid number.

I have found that with the aid of the volatile, lower members of the series of saturated monobasic aliphatic acids and particularly formic and acetic acids, preferably the latter, mixtures of a polyhydric alcohol, a polybasic aliphatic acid and an oil or fat acid, which otherwise on reaction would yield two immiscible layers, can be made to produce a homogeneous, soluble resinous composition. The acetic or equivalent acid can be added to the reacting mixture as such, or it may be introduced in the form of the acetic acid esters of the polyhydric alcohol.

One of the difficulties presented by the above process is the complete expulsion of the acetic or equivalent acid in order to obtain a product of low acid number. The prolonged heating at elevated temperatures required to drive off all of the free and combined acetic or other acid frequently results in gelling of the mass. The gelling may to a large extent be prevented by using a considerable excess of the polyhydric alcohol, but this is undesirable because the excess alcohol or free hydroxyls impair the drying qualities of the resinous product.

I have found, however, that the reacting mixture may safely be heated as long and as high as is required to expel all of the volatile monobasic acid even when the alcohol and the polybasic and oil or fat acids are present in equivalent proportion (that is, no substantial excess of glycerol is present), by adding to the mixture of neutral, inert solvent of a boiling point preferably above the reacting temperature; the mixture can then be heated until it is substantially free of volatile acid, the product obtained having a correspondingly reduced acid number and possessing excellent drying qualities.

According to the present invention, I cause a polyhydric alcohol, preferably glycerol, to react with an aliphatic acid of low molecular weight, preferably acetic acid or other volatile acid, until a certain degree of reaction has taken place to produce one or more of the partial esters of the polyhydric alcohol. This reaction product is then heated at elevated temperatures with one or more polybasic organic acids including a preponderating proportion of dibasic aliphatic acids, such as maleic acid or anhydride, and with an acid obtained by hydrolysis of an oil, fat or wax, the proportions of alcohol on the one hand and of polybasic acid and oil, fat, or wax acid on the other being preferably approximately equivalent. This heating may be continued until a part of the acetic acid has been expelled, but before the mass begins to gell, a neutral, inert solvent, such as a petroleum or coal tar distillate, or a mixture of these solvents being then added to the mass and the mixture heated until the acetic acid has been expelled and a product of reduced acid number is obtained. The solvent may be added to the reacting mass in stages, or it may be added all at one time, and it may be mixed with the initial reacting materials.

It is generally preferable to react the glycerol with the volatile monobasic acid first, and then heat the product with the polybasic acid and the oil or equivalent acid. I have found that while the mixture obtained by refluxing glycerol and acetic acid yields highly desirable results, the acetins obtainable commercially are not as satisfactory. They do not appear to react with the other acids and do not readily decompose. The product obtained therewith does not body quickly and the solubilities of the product are generally poor. In certain cases the reacting mass cannot be made to clarify before gelling sets in.

The resinous compositions obtained according to the present invention are quick-drying (when made with the acids of a drying oil) and oil-soluble and are compatible with known resins and varnishes, including ester gums, wood oil and other oil varnishes (preferably slightly bodied), fossil gum varnishes, phenol-formaldehyde varnishes, etc. If desired, any drying or non-drying oil or a varnish or phenol-formaldehyde-natural resin condensates, cumarone resins, asphaltums, pitches, waxes, etc. can be added at any stage in the process.

By the use of these low molecular weight acids it thus becomes possible to produce homogeneous, oil-soluble resins of relatively low acid number without danger of gelling under conditions under which in the absence of such acids the polybasic aliphatic acid and the high molecular weight fatty oil or fat acid would yield two immiscible layers the lower one of which would ultimately gel and become infusible.

The present invention thus embodies the discovery that by the addition of a low molecular weight aliphatic acid, preferably one having no more than five carbon atoms, and particularly volatile acids containing from one to three carbon atoms, to a mixture of a polyhydric alcohol, a polybasic aliphatic acid of the type indicated and an acid or the acids derived from a fatty oil or from a fat, which mixture alone would on heating yield two incompatible materials, the formation of such incompatible materials is prevented and there is produced a uniform and homogeneous resinous mass; and also the discovery that with the aid of an inert solvent, such volatile acid can be substantially completely expelled and the acidity of the product thus kept low, such complete expulsion and the desired reaction being favored by the use of a strongly acid reaction product of the alcohol and the volatile acid.

Among the polybasic aliphatic acids that may be employed in the above described reaction, maleic and succinic acids are preferred, although malic and tartaric acids or mixtures of these acids may be used. My process is of advantage not only with these polybasic aliphatic acids, but also with a mixture of such acids with phthalic acid in such proportions (as, for example, 3 mols or more of maleic acid to one of phthalic) as would form two immiscible layers on simultaneous reaction with, for example, glycerol and linseed oil acids.

In the preferred method of carrying out the present invention I first form a material which I call glycerol-acetic product by heating the following materials:

Glycerol_____ 92 grams (1 mol.)
Acetic acid_____ 75 grams (1¼ mols)

at the boiling point under reflux. The boiling starts at about 135° C. but as the reaction proceeds with formation of water, the boiling point drops gradually to about 125° C. After about 10 hours' heating a reaction product is obtained having an acid number of about 150, indicating a content of 15-20% free acetic acid. This mixture, which contains glycerol-acetic acid esters, acetic acid, and water, is used in the following examples:

Example 1

Linseed oil fatty acids____ 280 grams (1 mol.)
Glycerol-acetic product___ 167 grams (equivalent to one mol. of glycerol)
Maleic anhydride_____ 98 grams (1 mol.)

are heated gradually to about 180° C. in an inert atmosphere with good stirring. About one hour should be consumed in reaching this temperature and the mass is kept at such temperature for about two hours; during this time some of the acetic acid and water of reaction are driven off, but most of the acetic acid still remains and its complete removal under these conditions is impossible as the material is very viscous even at 180° and would soon gell if the heating were continued. At this point about 216 grams of solvent are added, consisting of equal parts of mineral spirits and coal tar solvent naptha. The solution now consists of about 2 parts resin and one part solvent. The solution is heated at 160-165° C. for about 10 hours, the stirring being continued and an inert gas being passed through the mixture. This heating removes most of the remaining acetic acid and brings the viscosity of the solution when adjusted to final solvent to about tube H of the Gardner-Holt viscosity scale. There are now added about 216 grams of mineral spirits and the heating is continued until the viscosity of the solution reaches about tube O of the Gardner-Holt scale. This requires about five more hours of heating at about 160° C. The last portions of acetic acid are removed during this treatment and the acid number of the solution reaches about 30. Any solvent distilling over during the process should be replaced in the resin solution.

The finished solution is substantially free from acetic acid and represents a solution of the finished resin in an equal weight of a solvent consisting of one part of coal tar solvent naphtha and three parts of mineral spirits. It is compatible at room temperature with drying and non-drying oils and with resins, such as natural resins, esterified natural resins, modified phenolic resins, cumarone resins, etc. and with varnishes made from these oils and resins. It can be used by itself with the usual driers to give hard, tough, non-yellowing air-drying as well as baking films, or in combination with the above varnish materials to yield vehicles of any desired combination of properties. The solution itself as well as the mixtures thereof with other materials can be used as vehicles for white and colored enamels. As the removal of the acetic acid is complete, all coatings made with this vehicle are non-corrosive and can be used on metallic surfaces.

*Example 2*

Linseed oil fatty acids_____ 280 grams (1 mol.)
Glycerol-acetic product___ 200 grams (equivalent to 110 grams or 1.2 mols. of glycerol)
Maleic anhydride_____ 98 grams (1 mol.)
Coal tar naphtha_____ 110 grams are gradually heated to about 170° C. and kept at such temperature for about three hours, the volatile matter being permitted to pass over. 110 grams of mineral spirits are then added and the process continued as in Example 1 after the first addition of solvent.

About 20% more glycerol (as glycerol-acetic product) is employed in the preparation of this resin as compared with Example 1. A somewhat slower drying vehicle having an acid number of about 20 is obtained, the properties of the resinous solution in all other respects being similar to those of the composition obtained in Example 1.

*Example 3*

Instead of adding a drying or non-drying oil varnish at room temperature to the finished resin solution obtained according to either of the preceding examples, such varnish, preferably only slightly bodied, is incorporated in the process of Example 1 or 2 at any desired stage of the process. The amount of inert solvent is then adjusted in accordance with the non-volatile content both of the resin obtained according to Example 1 or 2 and of varnish.

The glycerol may be replaced by other polyhydric alcohols and the linseed oil acids by the acids of other oils, both drying and non-drying, and of fats, or by mixtures of these acids, as is well understood in the art.

I claim:

1. The method of producing oil-soluble resin compositions, which comprises heating glycerol with a saturated volatile monobasic aliphatic acid having up to five carbon atoms until partial reaction has taken place and an acid-reacting mixture is obtained, reacting such mixture essentially with a polycarboxylic aliphatic acid and with acid obtained by hydrolysis of a member of the group consisting of oils, fats and waxes, and then continuing the heating in the presence of a solvent until substantially all of the volatile monobasic acid has been expelled.

2. The method of producing oil-soluble glycerol-dibasic aliphatic acid resin compositions, which comprises heating glycerol with a saturated volatile monobasic aliphatic acid having up to five carbon atoms until partial reaction has taken place and an acid-reacting mixture is obtained, reacting such mixture essentially with a dibasic aliphatic acid and with an acid obtained by hydrolysis of a member of the group consisting of oils, fats and waxes, and then continuing the heating in the presence of a solvent until substantially all of the volatile monobasic acid has been expelled, the proportions of glycerol on the one hand and of dibasic acid and oil, fat or wax acid on the other hand being substantially equivalent.

3. The method of producing oil-soluble glycerol-dibasic aliphatic acid resin compositions, which comprises heating glycerol with acetic acid until partial reaction has taken place and an acid-reacting mixture is obtained, reacting such mixture essentially with a dibasic aliphatic acid of the type which forms a non-homogeneous mass on reaction with glycerol and a relatively large proportion of fatty oil acids, and with an acid obtained by hydrolysis of a member of the group consisting of oils, fats and waxes, and then continuing the heating in the presence of a solvent until substantially all of the acetic acid has been expelled.

4. The method of producing oil-soluble glycerol-dibasic aliphatic acid resin compositions, which comprises refluxing 1 mol. of. gycerol with approximately 1¼ mols of acetic acid until a mixture having an acid number of about 150 is obtained, reacting such mixture with a member of the group consisting of maleic, succinic and malic acids, and with an acid obtained by hydrolysis of a member of the group consisting of oils, fats and waxes, and then continuing the heating in the presence of a solvent until substantially all of the acetic acid has been expelled.

5. The method of producing oil-soluble glycerol-dibasic aliphatic acid resin compositions, which comprises refluxing 1 mol. of glycerol with approximately 1¼ mols of acetic acid until a mixture having an acid number of about 150 is obtained, reacting such mixture with a member of the group consisting of maleic, succinic and malic acids, and with acid obtained by hydrolysis of a member of the group consisting of oils, fats and waxes, in an amount approximately equivalent to the glycerol at a temperature of about 180° C., adding a neutral solvent before gelling sets in and continuing the heating until most of the acetic acid has been expelled, adding a further quantity of solvent and heating the mixture until the remaining portion of acetic acid has been driven off.

6. The method of producing oil-soluble glycerol-dibasic aliphatic acid resin compositions, which comprises refluxing 1 mol. of glycerol with approximately 1¼ mols of acetic acid until a mixture having an acid number of about 150 is obtained, reacting such mixture with maleic acid and drying oil acid in an amount approximately equivalent to the glycerol, and then continuing the heating in the presence of an inert solvent until substantially all of the acetic acid has been expelled.

7. The method of producing oil-soluble glycerol-dibasic aliphatic acid resin compositions, which comprises refluxing 1 mol. of glycerol with approximately 1¼ mols of acetic acid until a mixture having an acid number of about 150 is obtained, reacting such mixture with approximately 1 mol. of maleic acid and 1 mol. of drying oil acid at about 180° C. until the water and part of the acetic acid have been driven off, adding a neutral solvent before gelling has set in, and continuing the heating until substantially all of the acetic acid has been expelled.

8. A liquid resinous composition comprising essentially the reaction product of glycerol, a saturated volatile monobasic organic acid having up to 5 carbon atoms, a member of the group consisting of maleic, succinic and malic acids, an acid obtained by hydrolysis of a member of the group consisting of oils, fats and waxes in the presence of a solvent and from which the volatile monobasic acid has been substantially completely expelled by heating.

9. A liquid resinous composition comprising essentially the reaction product of glycerol, a saturated volatile monobasic organic acid having up to 5 carbon atoms, a member of the group consisting of maleic, succinic and malic acids, an acid obtained by hydrolysis of a member of the group consisting of oils, fats and waxes in the presence of a solvent, and from which the volatile monobasic acid has been substantially completely expelled by heating, the proportions of glycerol on the one hand and the total dibasic aliphatic acid and oil, fat or wax acid on the other being substantially equivalent.

10. A liquid resinous composition comprising essentially the reaction product of glycerol, acetic acid, a member of the group consisting of maleic, succinic and malic acids, an acid obtained by hydrolysis of a member of the group consisting of oils, fats and waxes, in the presence of a solvent, and from which the acetic acid has been substantially completely expelled by heating.

11. A liquid resinous composition comprising essentially the reaction product of glycerol, acetic acid, maleic acid, and an acid obtained by hydrolysis of a member of the group consisting of oils, fats and waxes, in the presence of a solvent, and from which the acetic acid has been substantially completely expelled by heating.

12. A liquid resinous composition comprising essentially the reaction product of glycerol, acetic acid, maleic acid, and a drying oil acid, in the presence of a neutral solvent and from which the acetic acid has been substantially completely expelled by heating, the glycerol, maleic acid and drying oil acid being present in approximately equimolecular proportions, said composition containing approximately one part of solvent to one of resin by weight and having an acid number of about 30.

13. The method of producing oil-soluble glycerol-dibasic aliphatic acid resin compositions which comprises heating glycerol, a saturated volatile monobasic aliphatic acid having up to five carbon atoms, a dicarboxylic aliphatic acid of the type which forms a permanently non-homogeneous mass on reaction with approximately equimolecular proportions of glycerol and fatty oil acids, a high molecular weight fatty acid obtainable on hydrolysis of a member of the group consisting of oils, fats and waxes until a homogeneous condensate is obtained, and then continuing the heating until the volatile acid has been substantially completely expelled.

14. The method of producing oil-soluble glycerol-dibasic aliphatic acid resin compositions, which comprises refluxing glycerol and acetic acid until partial esterification has taken place, heating a quantity of such product with a quantity of a polybasic aliphatic acid of the type which forms a permanently non-homogeneous mass on reaction with approximately equimolecular proportions of glycerol and fatty oil acids and a drying oil acid equivalent to the glycerol in the presence of an inert solvent until substantially all of the acetic acid has been expelled.

15. The method of producing oil-soluble glycerol-dibasic aliphatic acid resin compositions, which comprises refluxing glycerol and acetic acid until partial esterification has taken place, heating a quantity of such product with an approximately equivalent quantity of acids consisting of (1) a polybasic aliphatic acid of the group consisting of maleic, succinic, and malic acids (2) phthalic acid, and (3) a drying oil acid, in the presence of an inert solvent until substantially all of the acetic acid has been expelled, the relative proportions of polybasic aliphatic acid and phthalic acid being such that two incompatible materials would result on heating in the absence of the acetic acid.

ISRAEL ROSENBLUM.